United States Patent [19]

Noske et al.

[11] Patent Number: 4,851,909
[45] Date of Patent: Jul. 25, 1989

[54] METHOD AND APPARATUS FOR MAINTAINING AUDIO/VIDEO SYNCHRONISM IN A TELEVISION SIGNAL READ-OUT FROM A DIGITAL BUFFER MEMORY BY A REFERENCE SIGNAL

[75] Inventors: Reiner Noske, Darmstadt; Hans-Peter Richter, Gross-Bieberau; Jurgen Heitmann, Alsbach-Hähnlein, all of Fed. Rep. of Germany

[73] Assignee: Robert Bosch GmbH, Stuttgart, Fed. Rep. of Germany

[21] Appl. No.: 245,916

[22] Filed: Sep. 16, 1988

[30] Foreign Application Priority Data

Sep. 24, 1987 [DE] Fed. Rep. of Germany ....... 3732111

[51] Int. Cl.⁴ ........................ H04N 5/04; H04N 5/093
[52] U.S. Cl. .................... 358/149; 358/145; 358/143; 358/198; 358/320; 358/337; 358/339; 360/36.1; 360/36.2
[58] Field of Search ............... 358/142, 143, 144, 145, 358/148, 149, 320, 337, 339, 185, 198; 360/36.1, 36.2

[56] References Cited

U.S. PATENT DOCUMENTS

| 4,333,108 | 6/1982 | Quan et al. ........................... 358/145 |
| 4,442,461 | 4/1984 | Shirai et al. ......................... 358/145 |
| 4,618,890 | 10/1986 | Kouyama et al. ................... 358/149 |
| 4,644,400 | 2/1987 | Kouyama et al. ................... 358/149 |
| 4,665,431 | 5/1987 | Cooper ................................. 358/145 |
| 4,703,355 | 10/1987 | Cooper ................................. 358/149 |

FOREIGN PATENT DOCUMENTS 3109091 10/1983 Fed. Rep. of Germany .

OTHER PUBLICATIONS

"Fernseh-und Kino-Technik", No. 5, 1981, pp. 175-177.

Primary Examiner—James J. Groody
Assistant Examiner—Michael D. Parker
Attorney, Agent, or Firm—Frishauf, Holtz, Goodman & Woodward

[57] ABSTRACT

Both the analog and the video component of a television signal are converted to digital form, the audio component being converted at a much lower sample rate with a word length which is an integral multiple of the video word length. The digital audio component is then compressed by use of a temporary memory and read-out therefrom at a rate that is half of the sample rate of the digtal video component, after which the word length is halved and the word rate doubled in a shift register circuit. In that form the audio component is inserted in horizontal blanking intervals of the video component in a compatible form by a multiplexer, the output of which is read into a single picture field or full picture memory under control of an address generator clocked in synchronism with the incoming video component. The buffer memory is read-out at a rate controlled by a reference signal such as is used for synchronism in a television studio. On the output side the digital video and audio components of the television signal are separated by a demultiplexer, the audio word length is doubled and the word rate halved and the still compressed audio signal is expanded, to make available a substantially continuous digital component. The audio component can then be converted to analog form and will be correctly timed for accompanying the digital video component converted to analog form at the output of the demultiplexer. Separate audio signal delay circuits are thus avoided by the use of relatively simple multiplexing circuits and audio processing circuits.

11 Claims, 7 Drawing Sheets

METHOD AND APPARATUS FOR MAINTAINING AUDIO/ VIDEO SYNCHRONISM IN A TELEVISION SIGNAL READ-OUT FROM A DIGITAL BUFFER MEMORY BY A REFERENCE SIGNAL

This invention concerns the synchronizing sound with picture movements in television signals which have been stored in digital form in a temporary memory and read out therefrom in a manner independent of the writing of the signals into the memory. Providing such synchronization is sometimes known as propagation time equalization because the delay produced in processing the video signal by means of the memory is regarded as adding to the propagation time of the video signal, requiring comparable delay of the audio signal.

The timing of a particular extraneous video signal to the "synchronization plane" within a television studio is known from the periodical "Fernseh-und Kino-Technik", No. 5, 1981, pgs. 175–177. In this known method a video signal which is asynchronous with respect to the regime of the television studio is converted from analog to digital form and is written into a picture field memory at a rythm derived from the asynchronous video signal. A read-out is performed from the digital picture field memory with a rythm derived from a video reference signal. When a picture field memory is used for a PAL-coded video signal the greatest difference in propagation time between write-in and read-out of the picture field memory is 20 milliseconds. A still greater delay time (40 ms) arises when full frame memories are used. In order to assure a lip-to-speech synchronization between a video signal thus re-timed and the accompanying audio signal, the audio signals are usually equalized for the delay time of the video signal in so-called audio synchronizers. Such audio synchronizers contain a digital memory as a controllable delay unit. The audio signal is delayed by a delay time corresponding to the difference of propogation time between the incoming and outgoing video signals.

SUMMARY OF THE INVENTION

It is an object of the present invention to provide for lip synchronization between video and audio signals in a system in which the video signal needs to be re-timed by means of a digital picture memory and to do so in a manner and with equipment which is less expensive than in the practice heretofore.

Briefly, before writing the video signal into a temporary memory the audio signal is inserted into the blanking intervals of the video signal, and after reading out the video signal from the memory, the inserted audio signal is re-separated from the video signal. More particulary, the audio signal is sampled to put it in pulse code form and the resulting digital audio signal is inserted compatibly into the horizontal blanking intervals of the video signal in time-compressed form. Compatible insertion may advantageously be obtained with reduction of the audio digital word length to the video digital word length.

The transmission of audio signals by pulse width modulations in the horizontal blanking intervals of video signals was discolosed in German Patent No. 31 09 091, which reviews earlier similar proposals. In all those proposals, the aim was merely to limiting the frequency band required for transmission of audio signals accompanying a picture signal and to avoid the interference with picture sharpness resulting from the usual FM sound carriers.

The invention has the advantage that it saves the provision of a separate audio signal memory for delaying the audio signal that accompanies a video signal. Not only is the expense and space of a separate audio memory saved but expensive circuits for control of the audio memory are also dispensed with. In particular there is an advantage that when a number of such operations requiring audio to video synchronization are cascaded, the audio signal accompanying the video signal remains exactly timed in step with the propagation of the video signal. Such cascading of stages introducing propagation time delays commonly occurs in large television transmission nets, for example the transmission paths utilizing orbiting earth satellites.

The invention is particularly useful for more audio signals, for example stereo signals, are inserted in the region of the blanking intervals of a video signal, with the audio signals being multiplexed by analog or digital techniques. This is even more economical of memory capacity.

BRIEF DESCRIPTION OF THE DRAWINGS

The invention is further described by way of illustrative example with reference to the annexed drawings, in which.

DESCRIPTION OF THE ILLUSTRATED EMBODIMENT

Figure 1:
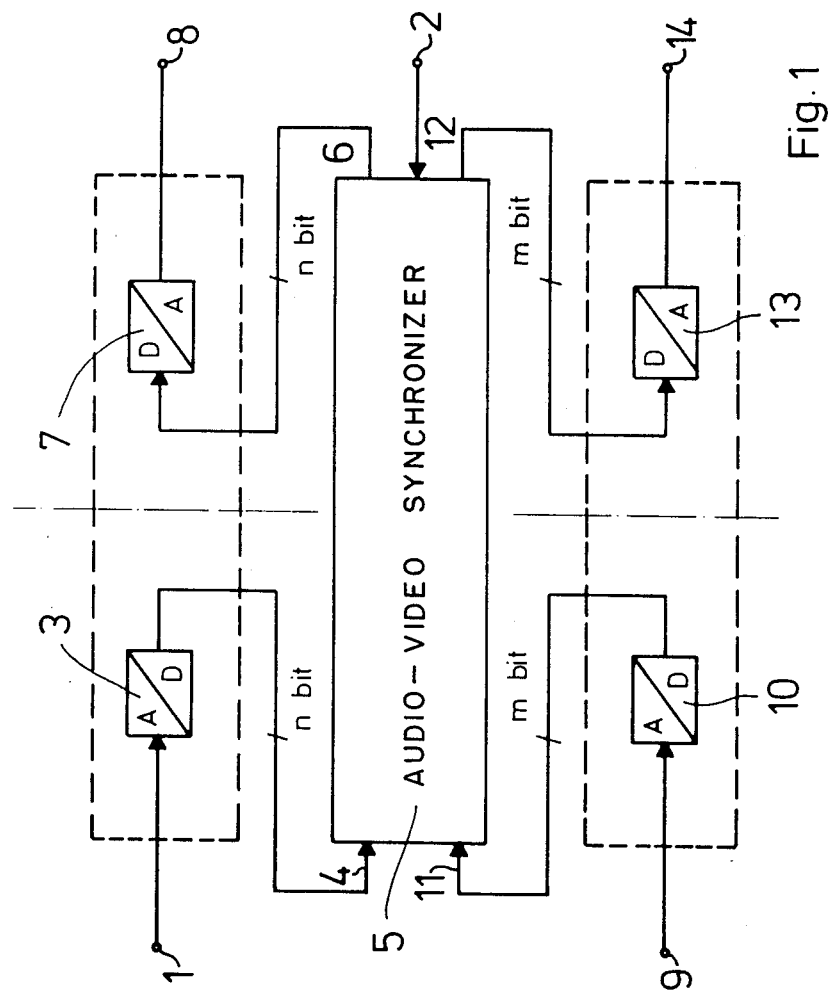
FIG. 1 is a block circuit diagram for explaining the basic principle of the invention.

The block diagram of FIG. 1 shows, only in its most basic form, an audio and video synchronizer for practicing the method and embodying the apparatus of the invention. At the terminal 1 an analog video signal is available which is asynchronous with reference to a studio reference signal by reference to which the timing regime of a television studio is established and which is made available at the terminal 2. The analog video signal is converted to a digital signal in the A/D converter 3, the output of which is supplied to an audio-video synchronizer 5 further described with reference to FIGS. 2 and 3. The word width of the digital video signals is n-bits. From an output 6 of the audio video synchronizer 5 a digital video signal which is now synchronous to the studio reference signal is supplied to a D/A converter 7 and converted to analog form. The desired analog video signal is accordingly made available at the terminal 8.

As indicated in broken lines at the top of FIG. 1 the A/D converter 3 and D/A converter 7 provided in the video signal path are advantageously combined into a single component in order to minimize cross-talk with parallel audio signal paths. The A/D converter 10 and the D/A converter 13 in the audio signal path are likewise combined into a single unit for cross-talk reasons. Both of these combined units can be regarded as inserts in the respective video and audio paths and respective cut-in points of those paths.

The video signal path described up to now is essentially the same as the video signal path of the known video synchronizers above-described. In those known video synchronizers, however, the picture memory is used only for the video signal.

In accordance with the method of the present invention the picture memory is now also used for sharing a matched propagation time by the audio signal accompanying the video signal. For that purpose the audio signal available at the terminal 9 is supplied through the A/D converter 10 to an input 11 of the audio video synchronizer 5, with the digital audio signal having a word width of m-bits (different from and generally much larger than the n-bits of the video signal).

In the audio video synchronizer 5 the digital audio signal is added in a manner described below to the video signal with which it is simultaneously subjected to signal processing, after which it is separated again from the video signal. The audio signal thus equalized in propagation time to the video signal then proceeds from an output 12 of the audio video synchronizer 5 to a D/A converter 13 which makes an analog audio signal available at a terminal 14.

Figure 2:
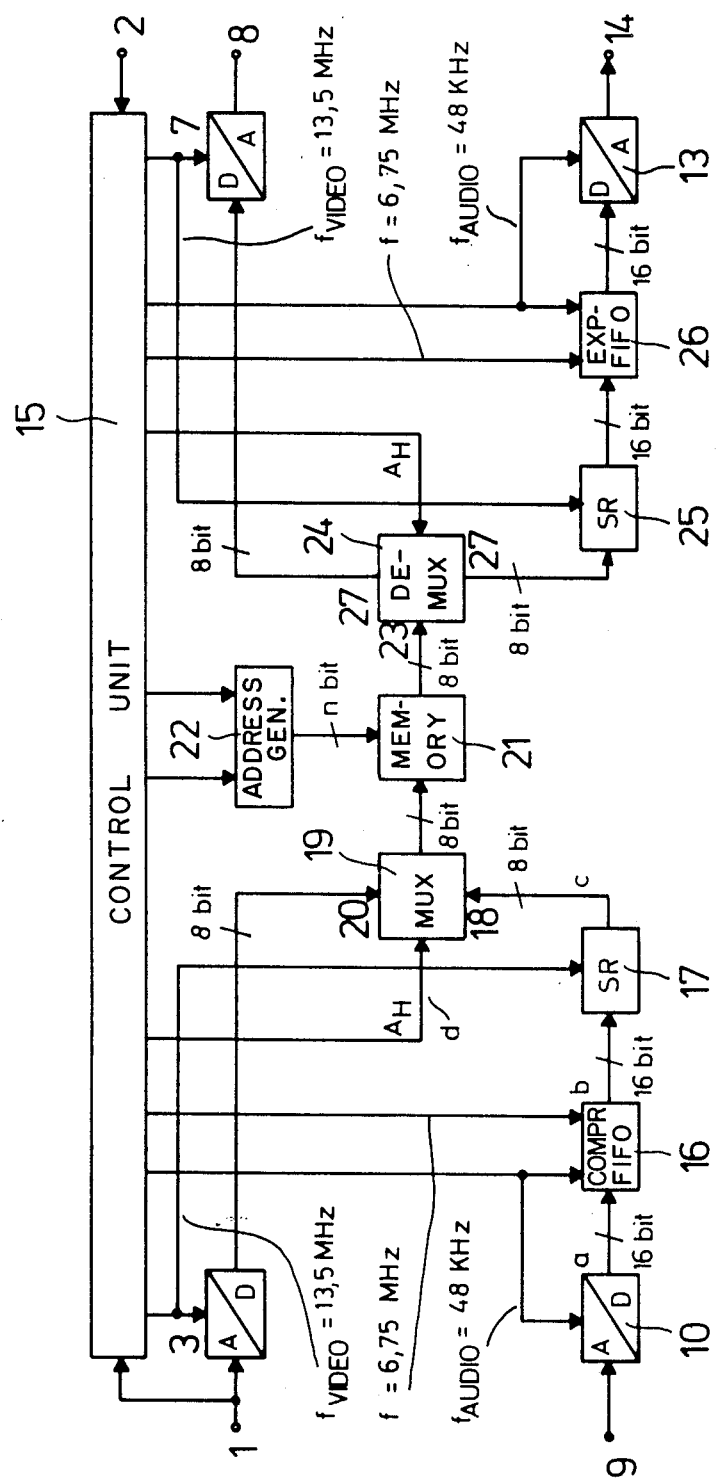
FIG. 2 is a more detailed block circuit diagram for explaining the invention.
Figure 3:
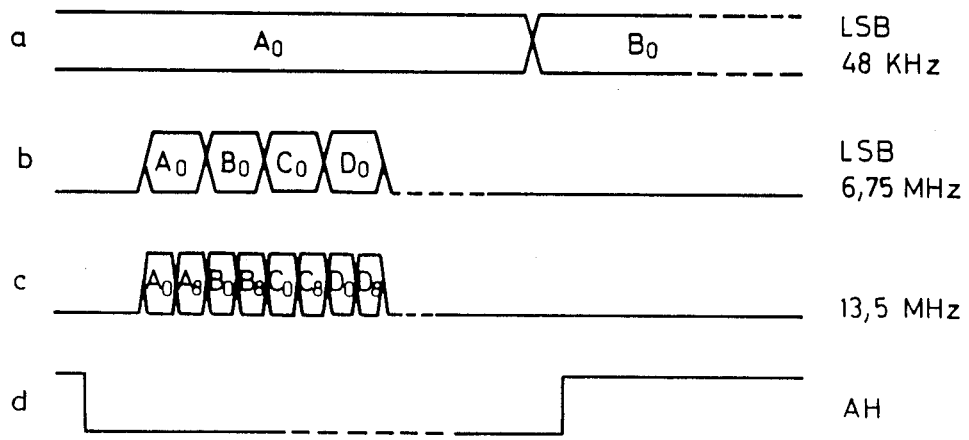
FIGS. 3a, 3b, 3c and 3d are diagrams plotting voltage against time to a common time scale to assist the explanation of the block circuit diagram of FIG. 2.

The block diagram of FIG. 1 is shown in more detail in FIG. 2. Blocks having the same function are provided with the same reference numerals.

The video signal which asynchronous to the studio reference signal is again made available at the terminal 1 and supplied to an A/D converter 3, at the output of which a digital video signal is made available over multibit parallel connections for a word width of 8 bits. An audio signal available at the terminal 9, however, is converted in an A/D converter 10 into a digital audio signal on multibit parallel connections for a word width of for example 16 bits. The asynchronous video signal is also furnished from the terminal 1 to a control unit 15 in which various clock and control signals are generated which are locked into step with the horizontal synchronizing signals of the asynchronous video signal and in other cases with the horizontal synchronizing signals of the studio reference signal. The locking in step of the signals is performed in known phase control loops (e.g. Gen-Lock) in wich oscillators with a frequency of 13.5 MHz are controlled. The individual clock and control signals are derived from the oscillator signals by frequency division and pulse shaping. The control unit 15 supplies a write-in clock signal with a frequency of 13.5 MHz for sampling the video signal in the A/D converter 3, a clock signal of a frequency of 48 kHz for sampling the audio signal in the A/D converter 10, a clock signal of a frequency of 6.75 MHz and also a horizontal frequency blinking signal.

The audio signal available at the output of the A/D converter 10 is supplied to the input of a compression memory 16 which for example consists of a first-in-first-out (FIFO) device. The digital audio signal is written into the FIFO 16 under clocking by the 48 kHz clock signal and then read-out again by the 6.75 MHz clock signal and supplied to a shift register 17. The audio signal is paced through the shift register by the 13.5 MHz clock signal to only 8 bit lines so that the 9th bit follows the first bit on one line the 10th follows the second on another and so on. In this process the word width of the audio signal is converted from 16 bits to 8 bits. The thus prepared audio signal is supplied to an input 18 of a multiplexer 19. The digital video signal is applied to another input 20 of the multiplexer 19. The control of the multiplexor 19 responds to a horizontal blanking signal $A_H$ which appears at the television line frequency. The output of the multiplexer 19 is connected to a memory 21 in which the combined video and audio signal is written in under the control of an address generator 22. During the write-in operation the address signal is derived from the asynchronous video signal. The read-out from the memory 21 is performed with an address signal from the address generator 22 under control of the reference signal available at the terminal 2. The output of the memory 21 is connected with the input 23 of a demultiplexer 24 in which the video signal components and the audio signal components are separated again under control of a horizontal frequency blanking signal derived from the reference signal.

The separated component signals are respectively reconverted into analog video and audio signals by operations which are the inverse of those of the input side of the apparatus. For these operations clock signals are derived in the control unit 15 which are locked to the reference signal available at the terminal 2. The control unit 15 generates a clock signal of 13.5 MHz for the D/A converter 7 and a shift register 25, a clock signal of 48 kHz for the D/A converter 13 and an expansion memory 26 that likewise can be constituted as a FIFO device, as well as the already mentioned blanking signal for the demultiplexor 24.

The word width of the audio signal component as it appears from the output 27 of the demultiplexer 24 is changed from 8 bits to 16 bits in the shift register 25. This is performed in the shift register 25 which is connected for so doing in response to the 13.5 MHz block signals just mentioned. The output of the shift register 25 is connected to the input of the expansion memory 26 in which the digital audio signal is written in by means of a 6.75 MHz clock signal and read-out by means of 48 kHz clock signal. The time expanded 16-bit wide audio signal so obtained is then converted in the D/A converter 13 into an analog audio signal made available at a terminal 14. The digital video signal components provided at the output 7 of the demultiplexer 24 is directly reconverted into an analog video signal by the D/A converter 7. The analog video signal is made available at the terminal 8 by connection to the output of the converter 7.

Since the audio signal is transmitted in the horizonal blanking intervals of the video signal, the audio signal is subjected to the same delay as the related video signal. Thus no supplementary memory complications and expense are necessary for propagation time equalization of the audio signal with respect to the video signal in order to produce lip-to-speech synchronism. When a number of audio signals, for example a pair of stereo signals are combined before analog to digital conversion in the A/D converter 10 by frequency multiplex time multiplex procedures, it is also possible to transmit a number of audio signals in lip movement synchronism to the video signal in accordance with the invention.

The voltage vs time diagrams of FIGS. 3a...3d are useful for further explanation of the signal processing of the audio signal on the input side of the apparatus. FIG. 3a shows by way of example the least significant bits (lsb) of the digital audio signal at the output of the A/D converter 10. As shown in FIG. 2 the converter output is an 8-bit parallel output and for the other 7 bits similar processing takes place. The analog audio signal is sampled at 48 kHz in the converter 10. The sequence of digital words is designated here $A_n$, $B_n$, $C_n$, $D_n$... etc., the subscript n designating the particular bit. Thus $A_o$ designates the least significant bit of the first word, $B_o$ the least significant bit of the second word, and so on.

In the compression memory 16 the individual words are time-compressed, as a result of different reading and writing. FIG. 3b shows this time scale change for the least significant bit at the output of the compression memory 16.

In the device 17, $A_o$ which designates the least significant bit of the first word, $B_o$ the least significant bit of the second word, and so on, are respectively combined on one bit line with $A_8$ which designates the 9th bit of the first word and $B_8$, the 9th bit of second word, and so on.

Conversion of the word width from 16 bits to 8 bits by the shift register 17 causes the bits $A_o$ and $A_8$ to be transmitted from the shift register in a single word interval and likewise causes the bits $B_o$ and $B_8$ to be transmitted in the next word interval, and so on. This word length doubling is illustrated in FIG. 3c for the least significant bit at the output of the shift register 17. FIG. 3d shows the blanking interval of a horizontal scanning frequency blanking signal that is applied to the control input of the multiplexor 19. During the blanking interval the digital audio bursts shown, in small part, in FIG. 3c are inserted into the digital video signal.

Since the audio signal processing at the output side simply the converse of the input side of processing, other explanations of FIG. 2 is not necessary.

Figure 4:
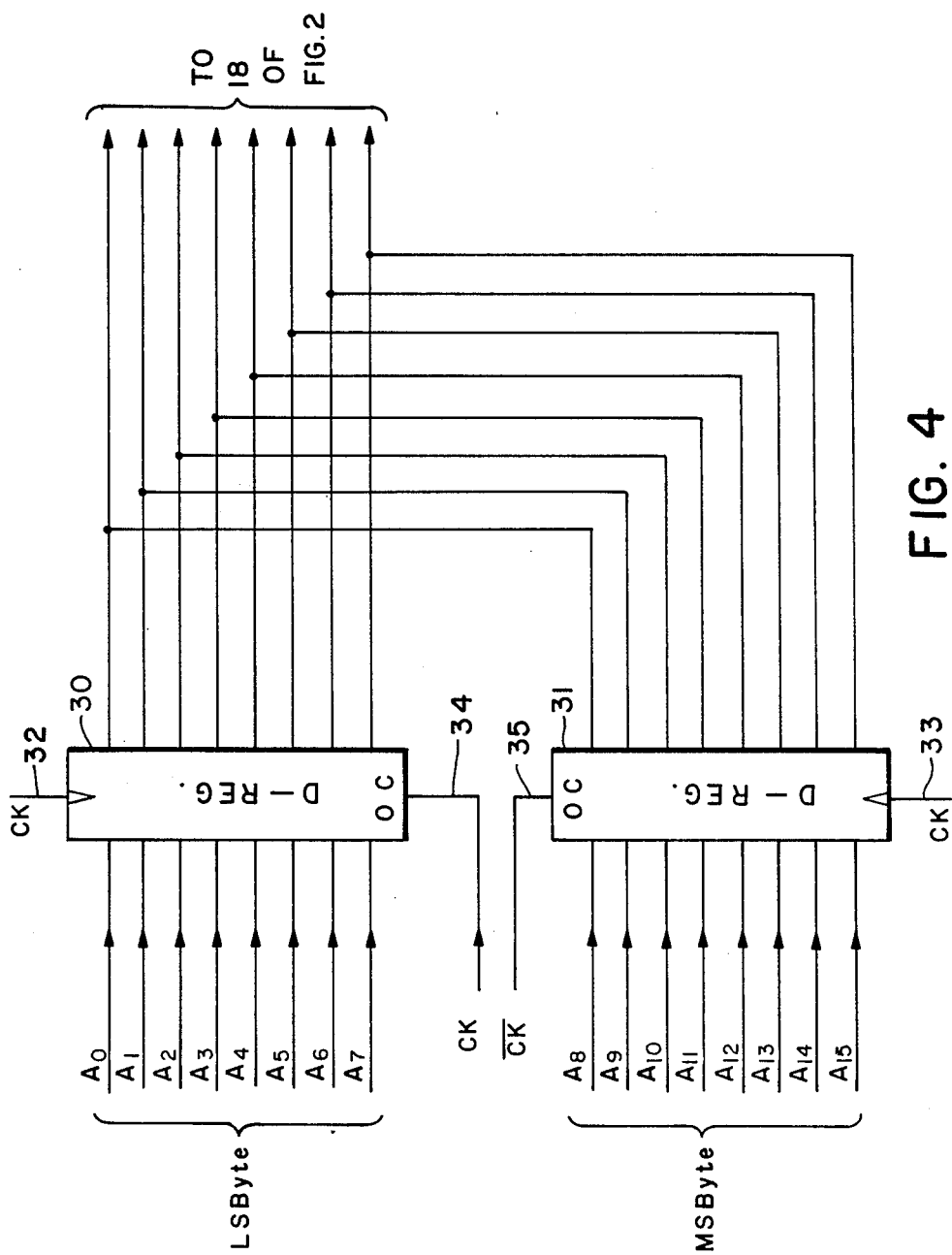
FIGS. 4 and 6 are respectively diagrams of the circuits of the units 17 and 25 of FIG. 2, and FIGS. 5 and 7 are timing diagrams respectively illustrating operation of the circuits of FIGS. 4 and 6.

FIG. 4 shows an illustrative embodiment of a shift register device halving the word width and doubling the word rate of a digital signal. The circuit of FIG. 4 utilizes two D-registers, for example of type 74LS374, each handling an 8-bit byte. Thus, the 16-bit audio words supplied by the time-compression FIFO 16 to the unit 17 of FIG. 2 must be split into a less significant byte (LSByte) furnished to the data inputs of the D-register 30 and a more significant byte (MSByte) supplied to the data inputs of the D-register 31. In FIG. 4 the 8-bits $A_0$...$A_7$ of the LSByte of the word A and the 8-bits $A_8$...$A_{15}$ of the MSByte of the same word are indicated on the bit lines going to the inputs of the D-registers.

Figure 5:
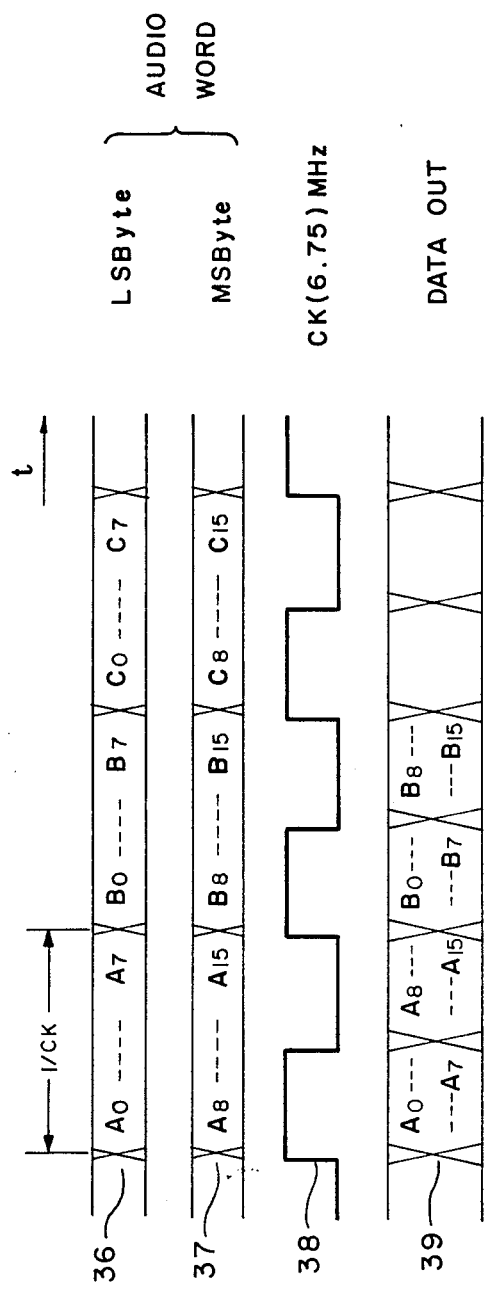

The clock inputs 32 and 33 of the respective D-registers 30 and 31 are similarly clocked by the clock pulses 38 shown in FIG. 5 which have a 1:1 duty cycle and a frequency of 6.75 MHz synchronized to the incoming television signal unit 15 of FIG. 2. The "output enable" inputs 34 and 35, identified as OC on the 74LS374 D-registers, however, are operated in phase opposition. Thus, the same clock signal furnished to the input 32 is furnished to the output enable input 34 of the D-register 30, while an inverse clock signal $\overline{Ck}$ (not shown in FIG. 5) supplied to the output enable input 35 of the D-register 31.

The processing accomplished in FIG. 4 is further illustrated in the timing diagram given in FIG. 5, which shows several clock periods 1/CK, the first one of which is identified at the upper left and carried through the four levels of the diagram by vertical broken lines. At the first or top level 36 of FIG. 35 the intervals for which the LSBytes are presented to the D-register 30 are shown, while at the second level 37 the intervals during which the MSBytes are presented to the input of the D-register 31 are shown. The third level 38 shows the clock signals CK supplied to the inputs 32 and 34 of the D-register 30 and to the input 33 of the D-register 31. The fourth or bottom level 39 shows the sequence of the 8-bit bytes obtained by interleaving the outputs of the D-registers 30 and 31 by simply connecting the outputs together as shown in FIG. 4. This output goes to the terminal 18 of the multiplexer 19 of FIG. 2 as an 8-bit wide digital transmission with a data rate of twice the clock frequency of the D-registers 30 and 31, so that the multiplexer 19 operates at the 13.5 MHz data rate for both video and audio information.

FIG. 5 shows a corresponding illustrative example of a shift register device for performing the function of the unit 25 of FIG. 2, namely to double the word width and halve the word rate, thus restoring the original 16-bit word width of the audio signal samples.

In this case the 8-bit words supplied at the 13.5 MHz rate by the demultiplexer 23 of FIG. 2 are furnished in parallel to two D-registers, which, again, are of type 74LS374 in the illustrated example. These inputs are shown in the timing diagram of FIG. 6 at the top or first level, above which at the left is shown a clock period 1/CK. The clock signal supplied at the input 42 of the D-register 40 is shown on the second level 45 of FIG. 6 and the inverse clock signal supplied at the clock input 43 of the D-register 41 is shown on the third level 46 of FIG. 6.

Figure 6:
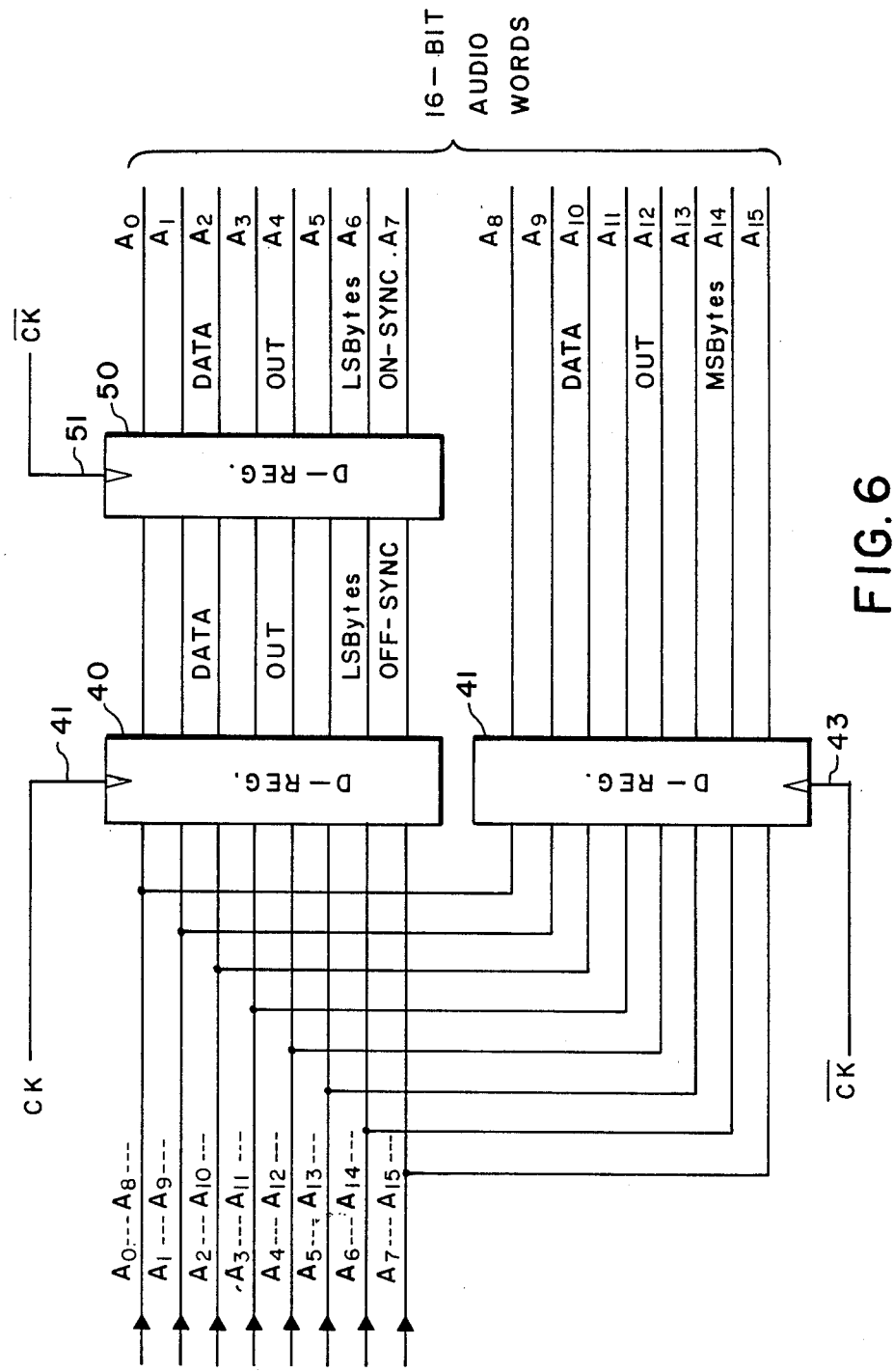
Figure 7:
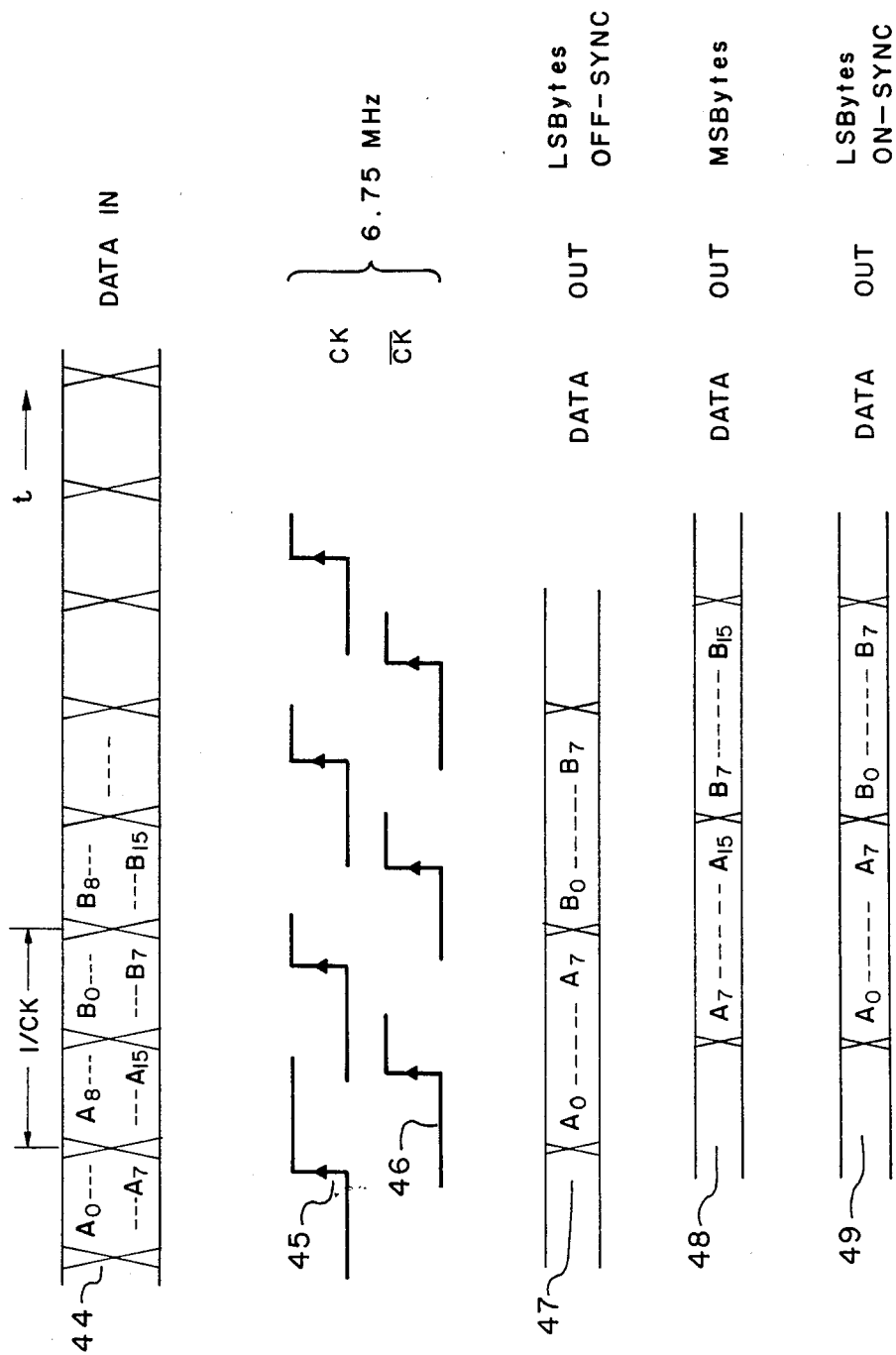

Because the clock signals are effective to load the D-registers 40 and 41 only on their rising flanks, the D-register 40, clocked with the clock signal shown at 45 in FIG. 6 is loaded only with LSBytes of the input data, while the D-register 41, clocked by the inverse clock signal shown at 46 in FIG. 6 is loaded only with the MSBytes of the input data. The rising flank of the clock signal may be designed to appear at any time during which the data to be selected in this alternate fashion is present. In FIG. 6, the clock signal is shown as occurring near the end of that time interval (compare levels 44, 45 and 46 of FIG. 6). This brings the interval for which the selected data is available at the output of the particular D-register into a full clock period suitably timed for further processing. The LSByte output of the D-register 40 is shown on the fourth level 47 of FIG. 6 and the MSByte output of the D-register 41 is shown on the fifth level 48 of FIG. 6. It then remains necessary to delay the output of the D-register 40 by half a clock period which is performed by the D-register 50 interposed in the output of the D-register 40 clocked by the inverse clock signal shown at 46 in FIG. 6. The result is shown at 49 on the sixth or bottom level of FIG. 6.

Since both bytes are thus made available for the same intervals, the bits on all 16 lines shown at the right of FIG. 6 together provide the properly timed 16-bit audio words.

The method of the invention is not limited to the video signal processing portion illustrated in the circuit block diagram. Other ways of inserting the audio signal into the blanking intervals of the video signal in a compatible way are likewise possible. It will therefore be seen that although the invention has been described with reference to a particular illustrative example, variations and modifications are possible within the inventive concept. For example the audio word length can be 3 or 4 times the video word length and even an ratio like 3:2 for the audio word length to video word length ratio is usable. Details regarding minor delays, for example of a clock pulse or so which may be necessary for reliable transfer of digital signals from one unit to the next which have not been mentioned in the specification, since these matters are well understood in the art. In general delays are minimized by using parallel transmission of the bits of digital words from one unit to another. It may be convenient to use the blanking interval signal to start the read-out from the compression memory 16, for example. It may also be convenient for the compression memory 16 to be divided so that one part can be read out while another part is being written into. This would involve writing into the memory 16 a portion of the digital audio signal that is sufficient to fill one horizontal blanking interval while another such portion is being read out from another part of the memory 16 that was previously written into. The delay of one television line involved in so doing is not important for audio synchronization to video information. That is even more true of such small delays as may be involved in the word length and word rate changes. The same applies to the delays involved on the output side, for example in the time expansion step.

We claim:

1. Method of equalizing the propagation time of an audio component and a video component of a television signal in a system in which the video component, in digital form, is put into a temporary memory from which it is read out in synchronism with a reference signal, comprising the steps of:

putting said audio component into digital form at a predetermined digital sample rate, followed by time-compressing said digital audio component and inserting time-compressed portions of said digital audio component into successive horizontal blanking intervals of said video component when said video component is in digital form and before it is put into said temporary memory, so that said portions of said digital audio component will be put into and read out from said same temporary memory during horizontal blanking intervals in the putting in and reading out of said video signal thereinto and therefrom, and after reading said digital video component and said inserted portions of said digital audio components out from said temporary memory, separating said digital audio component portions from said video component and time-expanding them to restore said predetermined digital sample rate for said audio component portions and to produce a substantially continuous digital audio component of said predetermined sample rate.

2. Method according to claim 1, wherein said audio component of said television signal is composed of a plurality of audio subcomponents in separate channels and wherein said audio subcomponents are combined into a single digital audio component by audio multiplexing before time-compressed portions of said digital audio components are inserted into successive horizontal blanking intervals of said video components and wherein, further, after said inserted portions of said digital audio components are separated from said video component, audio demultiplexing is performed to separate said audio subcomponents.

3. Method according to claim 2, wherein the step of audio multiplexing is performed before putting said audio component into digital form at said predetermined digital sample rate and said step of audio demultiplexing is performed only after said multiplexed digital audio component has been restored to said predetermined digital sample rate and has been converted from digital form into analog form.

4. Method according to claim 2, wherein said audio subcomponents are separately put into digital form and then combined by time multiplexing produced at said predetermined digital sample rate for said audio component as a whole and wherein the step of audio demultiplexing is performed immediately after the time expanding step.

5. Method according to claim 1, wherein first and second clock signals and a horizontal blanking interval signal are derived from said video component before it is put into said temporary memory, wherein said first clock signal has a frequency corresponding to said predetermined digital sample rate and is used to clock said audio component in digital form out of an analog to digital converter and into a compression memory for time compression thereof, said second clock signal is used to read said audio component out of said compression memory and said horizontal blanking signal is used in a time multiplexer to insert a read-out from said time-compression memory into each horizontal blanking interval of said video component, and wherein third and fourth clock signals and a horizontal blanking interval signal are derived from a reference signal for control of read-out from said memory, said blanking interval signal is used for separation by demultiplexing of said audio and video components, said third clock signal, having the same frequency as said second clock signal, is used to write said separated audio signal component into an expansion memory and said fourth clock signal, having the same frequency as said first clock signal, is used to read said audio component out of said expansion memory.

6. Method according to claim 1, wherein the step of putting said audio component into digital form at said preterminded digital sample rate is performed in a manner providing a word width for the samples at said rate which is an integral multiple of the corresponding word width of said video component when said video component is in digital form.

7. Method according to claim 5, wherein the step of putting said audio component into digital form at said preterminded digital sample rate is performed in a manner providing a word width for the samples at said rate which is an integral multiple of the corresponding word width of said video component when said video component is in digital form.

8. Method according to claim 7, wherein a fifth clock signal is derived from said video component before it is put into said temporary memory and is used in a word length dividing device (17) to halve the word length of the audio component signal read out from said compression memory (16) and wherein a sixth clock signal is derived from said reference signal and is used to double the word length, in a word length multiplying device (26) for said audio component provided at an output of said demultiplexer (24).

9. Method according to claim 7, wherein the word length of said audio component is twice the word length of said video component, wherein the word length of said audio component is changed to equal that of said video component before the steps of putting said video signal into said temporary memory and is restored to its original value after separation of said audio component from said video component.

10. Apparatus for maintaining audio/video synchronism in a television signal read out from a digital buffer memory in step with a reference signal, said television signals having an audio component and a video component, said apparatus including said buffer memory and means for converting said audio component and said video component respectively into a digital audio component and a digital video component and wherein said digital audio component has a word width in bits which is an integral multiple of the word width of said digital video component, and further comprising:

- means for deriving from said television signal, before its conversion by said converting means, a first video component sample rate clock signal, an audio component sample rate clock signal, a first compressed audio component sample rate clock signal and a first horizontal blanking signal, said video and audio components being respectively furnished to said means for converting said video and audio components into respective digital video and digital audio components;
- time-compressing memory means for said digital audio component having means for writing said digital audio component into said time-compressing memory means under control of said audio component sample rate clock signal and for reading said digital audio component in time compression out of said time-compressing memory means under control of said first compressed audio component sample rate clock signal;
- means controlled by said first video component sample rate clock signal for dividing the word width and multiplying the word rate of said compressed digital audio component respectively by an integral number factor;
- multiplexing means controlled by said first horizontal blanking signal and by said first video component sample-rate clock signal for inserting said time-compressed digital audio component of increased word rate in successive horizontal blanking intervals of said video component;
- means controlled by said first video component sample-rate for writing said digital video component and said inserted digital audio component into said buffer memory;
- means for deriving from a reference signal a second video component sample-rate clock signal, a second compressed audio component sample rate clock signal, an expanded audio component sample rate clock signal and a second horizontal blanking signal;
- read-out means controlled by said second video component sample-rate clock signal for reading said digital video component and said inserted digital audio component out of said buffer memory;
- demultiplexing means controlled by said second horizontal blanking means and having an input connected to the output of said read-out means for separating said digital video component from said inserted digital audio component read out from said buffer memory;
- means controlled by said second video component sample rate clock signal for multiplying the word width and dividing the word rate of said read-out digital audio component by said integral number factor to produce at an output a digital audio component having a word rate equal to said second compressed audio component sample rate; and
- time expanding memory means connected to said output of said word width multiplying means, having an input controlled by said second compressed audio component sample rate clock signal and an output controlled by said expanded audio component sample rate clock signal for producing a substantially continuous digital audio component at a read-out output of said time expanding memory means.

11. Apparatus according to claim 10 also including means controlled by said second video component sample rate clock signal connected to an output of said demultiplexing means for converting said digital video component into a re-timed analog video component of a re-timed television signal and means connected to the output of said time expanding memory means for converting said substantially continuous digital audio component into an analog audio component correctly synchronized with said re-timed analog video component of said re-timed television signal.

* * * * *